United States Patent [19]

Olivero

[11] 3,813,479

[45] May 28, 1974

[54] COAXIAL CABLE JOINT

[75] Inventor: Oliviero Olivero, Florence, Italy

[73] Assignee: International Standard Electric Corporation, New York, N.Y.

[22] Filed: June 14, 1973

[21] Appl. No.: 369,738

[30] Foreign Application Priority Data
June 26, 1972 Italy .................................. 9563/72
Aug. 26, 1972 Italy .................................. 9648/72

[52] U.S. Cl. ............... 174/88 C, 174/89, 174/94 S, 333/97 R, 339/89 C
[51] Int. Cl. ........................................... H02g 15/08
[58] Field of Search..... 174/75 C, 84 R, 84 S, 88 C, 174/88 R, 88 S, 94 S; 339/89 R, 89 C, 89 M, 176 R, 176 E; 285/247–249, 322, 383; 403/289, 290; 333/97 R

[56] References Cited
UNITED STATES PATENTS
2,425,959  8/1947  Schoenborn .................... 174/88 C
2,546,309  3/1951  Kempf ............................. 174/21 C
2,657,252  10/1953  Mildner et al. ................... 174/88 C
3,320,575  5/1967  Brown et al. ................. 339/270 R X Primary Examiner—Darrell L. Clay
Attorney, Agent, or Firm—Thomas L. Peterson

[57] ABSTRACT

A joint for coaxial cables such as telephone cables which is suitable for cable transmission frequencies of 60 MHz. and high speed digital devices. The joint employs metal tubes which are externally conical in shape and are inserted in the ends of the sheaths of the cables. A connecting sleeve is coupled at its ends by terminal nuts over the metal tubes to grip the sheaths of the cables therebetween. Means are provided inside the sleeve extending between the metal tubes forming a continuous metallic cylindrical surface. The inside diameter of the metal tubes and the diameter of the cylindrical surface within the sleeve correspond to that of the cable sheaths to provide a constant impedance match. The joint also provides a stable mechanical junction between the cables.

9 Claims, 12 Drawing Figures

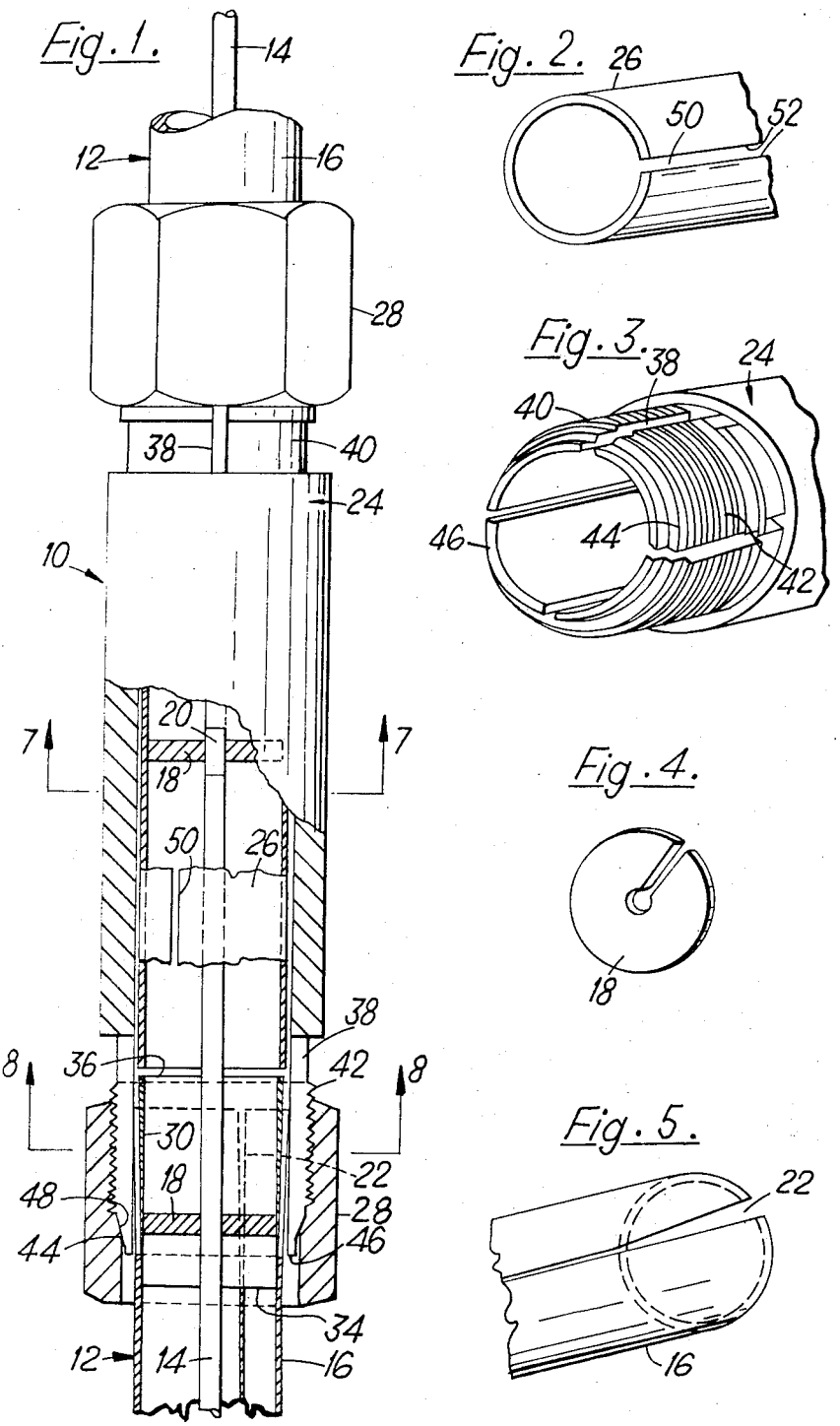

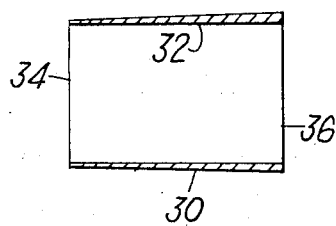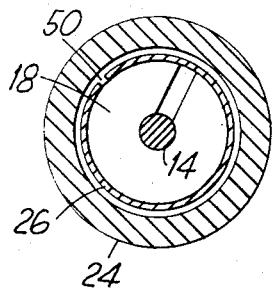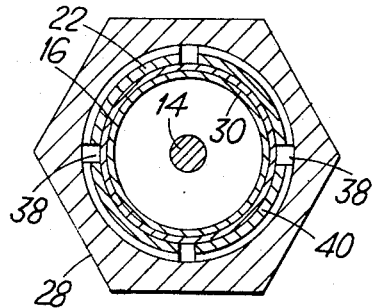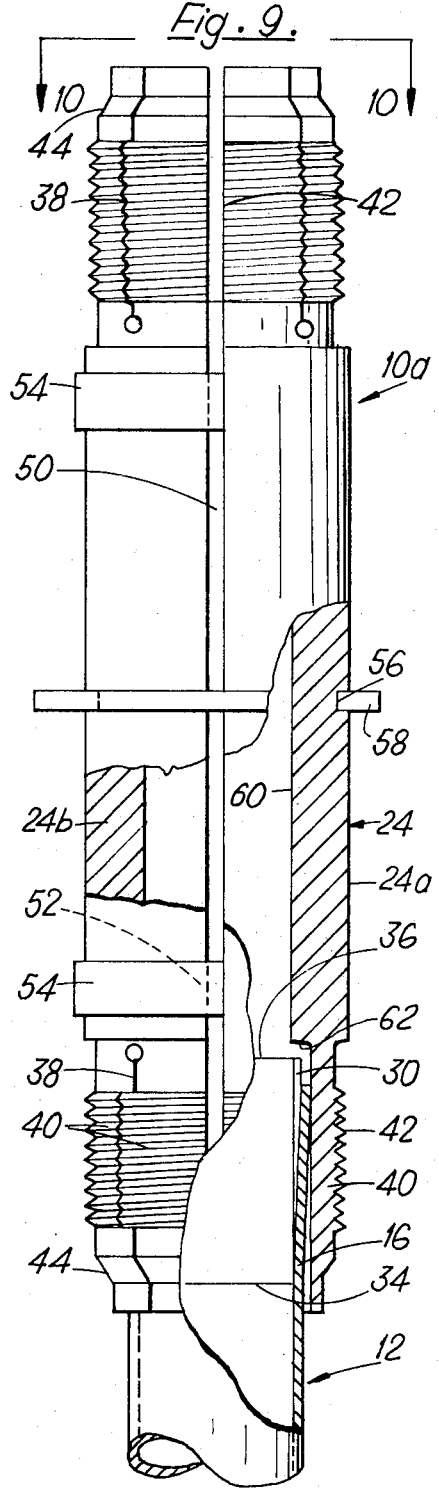

COAXIAL CABLE JOINT

BACKGROUND OF THE INVENTION

This invention relates to a coaxial cable joint and, more particularly, to a joint for coaxial cables, such as telephone cables and similar structures such as wave guide tubes, which is stable and suitable for relatively high cable transmission frequencies.

There is a need for coaxial cable joints which substantially improve transmission characteristics, particularly for transmission frequencies on the order of 60 MHz. and for high speed digital devices. This requires a joint which provides a constant impedance match between the cables, that is, a stable mechanical junction which provides a continuous dimensional relationship between the inner and outer conductors of the cables. Presently available cable joints do not entirely meet these requirements.

SUMMARY OF THE INVENTION

It is, therefore, the principal object of the present invention to provide an improved cable joint which is suitable for relatively high cable transmission frequencies.

According to the principal aspect of the present invention, a stable mechanical junction and constant impedance match is provided by the use of a joint which comprises two tubes which are externally conical in shape and have an inner diameter corresponding to that of the copper sheaths of the cables being joined. The tubes are inserted into the ends of the sheaths of the cables. A connecting sleeve provided with flexible externally threaded extensions receive nuts with tapered surfaces arranged to tighten the flexible extensions over the metal tubes to secure the copper sheaths therebetween. In one embodiment of the invention, a longitudinally slit tubular member is mounted within the connecting sleeve between the metal tubes. The inner diameter of the tubular member corresponds to that of the copper sheaths so as to provide a continuous metallic shield between the sheaths of the cables thereby providing a constant impedance match. In another embodiment, the sleeve is divided into two halves. The sleeve is formed with an intermediate reduced diameter section which extends between the metal tubes. The diameter of said intermediate section corresponds to that of said sheaths.

BRIEF DESCRIPTION OF THE DRAWINGS

FIG. 1 is a partial longitudinal sectional view of a joint constructed in accordance with the present invention;

FIG. 2 is a fragmentary perspective view of a tubular member utilized in the joint illustrated in FIG. 1;

FIG. 3 is a fragmentary perspective view showing one end of the connecting sleeve utilized in the joint illustrated in FIG. 1;

FIG. 4 is a perspective view of an insulating centering disc utilized in the joint;

FIG. 5 is a fragmentary perspective view of the end of a cable sheath split to receive an externally conical-shaped tube;

FIG. 6 is a longitudinal sectional view of the externally conical-shaped tube;

FIG. 7 is a transverse sectional view taken along line 7—7 of FIG. 1;

FIG. 8 is a transverse sectional view taken along line 8—8 of FIG. 1;

FIG. 9 is a partial longitudinal sectional view of an alternative form of the joint of the present invention;

DETAILED DESCRIPTION OF THE INVENTION

Figure 10:
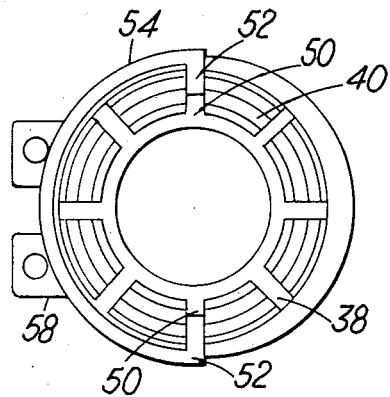
FIG. 10 is an end view of the joint illustrated in FIG. 9 taken along line 10—10.

Referring now to FIGS. 1–8 in detail, one embodiment of the cable joint of the present invention, generally designated 10, is shown joining two coaxial cables, each designated 12. Each cable includes an inner wire or conductor 14 and an outer concentrically arranged sheath or braid 16 formed of copper or the like. The sheath is covered by steel tapes and paper coating or the like, not shown. The wire 14 of each cable 12 is spaced from the sheath 16 by a radially split insulating disc 18.

The inner wires 14 of the cables 12 are joined together at their ends by soldering indicated at 20. The ends of the copper sheaths 16 are cut longitudinally as indicated at 22 to permit expansion of the sheaths for the purpose which will be seen later.

The joint 10 includes a connecting sleeve 24, an elongated tubular member 26, a pair of nuts 28, and two metal tubes 30. Each tube 30, which may be formed of steel or the like, is externally conical in shape and has an inner cylindrical cavity 32 therethrough corresponding to, i.e. equal to, the inner diameter of the sheaths 16 of the cables. The conicalness of each tube 30 is relatively limited and the thickness of the wall of the tube toward the end 34 thereof is relatively very thin. The material of which the tubes are formed is sufficiently rigid to assure the necessary mechanical strength to resist radial compression as required for the joining operation as will be described hereinafter. The tubes 30 are inserted into the split ends of the sheaths 16. The thicker ends 36 of the tubes 30 project out of the sheaths a short distance as seen in FIG. 1.

The connecting sleeve 12, which may be formed of brass or other suitable metal, has an inner diameter sufficiently large to receive the ends of the sheaths 16 with the tubes 30 inserted therein. The opposite ends of the sleeve 24 are slotted lengthwise at 38 so as to define suitably radially flexible sector extensions 40. The extensions are externally threaded at 42 and have outer tapered surfaces 44 in the region between the threads 42 and the terminal end 46 of the extensions 40. The sleeve 24 therefore defines clamping jaws at the opposite ends thereof. In order to operate such jaws the two nuts 28 are threaded on the externally threaded extensions 40. Each nut has an inner tapered surface 48 which cooperates with the tapered surfaces 44 on the extensions to cause the extensions to deflect radially inwardly when the nuts are tightened down thereon. Since the connecting sleeve 24 is shaped in such a manner that the tubes 30 and the slotted ends of the sheath 16 are located at the extensions 40, tightening of the nuts 28 over the extensions secures the sheaths against the tubes 30, thereby providing a stable mechanical connection between the two cables 12. If desired, the inner surfaces of the extensions 40 may be knurled or machine-worked in any other manner to provide substantial friction with the outer surfaces of the sheaths 16.

The tubular member 26 is longitudinally split throughout its entire length as indicated at 50. The tubular member is positioned coaxially within the connecting sleeve 24. The member 26 may be formed of copper as the sheaths 16. The tubular member has a length corresponding to the distance between the ends of the tubes 30 inserted into the sheaths. The diameter of the tubular member 26 is such that when the member is mounted within the sleeve 24, the edges 52 of the slit 50 will lie closely adjacent to one another to provide a substantially continuous metallic sheath surrounding the wires 14 of the cables which extend into the sleeve 24. An additional insulating disc 18 may be provided for centering the tubular member 26 so that the member will be coaxial with the conical tubes 30 which extend slightly out of the ends of the sheaths 16. The thickness of the wall of tubular member 26 is such that when the member is mounted in the connecting sleeve 24, the internal diameter thereof is equal to the inner diameter of the tubes 30 and the sheaths 16 of the cables so that a continuous metallic cylinder extends between the sheaths 16 of the two cables 12 which is spaced from the inner wires 14 of the cables the same distance as the sheaths, thereby providing a constant impedance match.

To form the joint 10 as described above, the following procedures may be followed. The paper coating or the like is torn off the sheaths 16 on the two cables 16. On one of the cables, the paper is torn off for a length sufficient to receive the connecting sleeve 24. The steel tapes on the sheaths are rolled on themselves so as to remain wound up during the connection operation. The sleeve 24 is then inserted with the two nuts 28 just screwed thereon by causing the same to slide on the sheath 16 which is uncovered to the greater extent by removing the paper coating therefrom. Then the ends of the sheaths 16 on the two cables are cut so as to define a desired distance therebetween for receiving the joint 10. The metal tubes 30 are then inserted into the ends of the two cable sheaths 16, with the thin edge 34 of the tubes extending into the sheaths and the thicker ends 36 of the tubes extending outside the sheaths. A disc-shaped paper element, not shown, is inserted on the two inner wires 14 of the cables to form a protection for the dielectric space for the cables. The wires are then cut so as to cause the same to face in contact with one another and are soldered at 20 in a known manner. The solder connection is then suitably finished and the protection paper is removed. The centering discs 18 are then positioned over the wires 14. It is preferred to arrange at least one disc 18 in a nearly central position relative to the joint 10 and one within each tube 30.

The tubular member 26 is then inserted over the centering disc 18 and wires 14 between the two tubes 30 so as to cover the free space between the inner ends of the tubes. The tubular member is tightened by the use of a suitable tool, not shown, so as to bring the same into a configuration and dimension of the cross-section of the sheaths 16. At this point, the connecting sleeve 24 is caused to slide, with the nuts loose thereon, over the tubular member 26 thus centering the same in such a manner that the extensions 40 on the sleeve surround the tubes 30. The two nuts 28 are then tightened so as to clamp the extensions 40 on the sheaths which surround the tubes 30.

The tubes 30 project out of the cut ends of the sheaths 16 so as to avoid the necessity of cutting and trimming of the sheaths inside the joint which could involve modifications of the electrical characteristics of the dielectric path in the gap between the conductive elements 14 and 16 of the cables.

Figure 11:
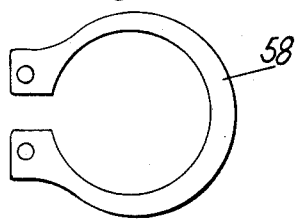
FIG. 11 is an elevational view of a spring clip utilized in the joint illustrated in FIG. 9.
Figure 12:
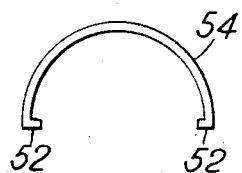
FIG. 12 is an elevational view of a spacer member utilized in the joint illustrated in FIG. 9.

A second embodiment of the invention, generally designated 10a, is illustrated in FIGS. 9–12 wherein parts corresponding to those employed in the embodiment illustrated in FIGS. 1–8 bear the same reference numerals. This embodiment is essentially the same as the first embodiment except for the following features. The connecting sleeve 24 is divided into two separate halves 24a and 24b by two longitudinal and diametrically opposed cuts 50, the width of which correspond to a cutting tool. The attainment of the geometrical cylindrical configuration of the inside of the sleeve 24 is provided by means of spacers 52 which correspond to the width of the cuts 50. The spacers are defined by inwardly bent ends of semicircular springs 54 which wrap or enclose one of the halves of the sleeve 24. For axially positioning the two halves of the sleeve so that their ends are in alignment, the sleeve 24 is formed with at least one annular groove 56 in which a snap ring 58 is received. The groove 56 is machined in the sleeve 24 before the sleeve is cut lengthwise into two halves. Thus, the ring 34 aligns the two halves of the sleeve so that the threaded ends 40 will exactly correspond with each other.

Each of the threaded ends of the sleeve 24 receives a nut, not shown, which is identical to the nut 28 illustrated in FIGS. 1 and 8.

An intermediate portion of the sleeve 24 between the threaded flexible extensions 40 is formed with a reduced diameter 60 which corresponds to the inner diameter of the sheaths 16. The thicker end 36 of each tube 30 is positioned closely adjacent to the end 62 of the reduced diameter section 60 of the sleeve 24 so that a continuous metallic cylindrical inner surface is provided in the joint having a diameter corresponding to that of the sheaths, thereby minimizing impedance irregularities. Since the sleeve 24 is longitudinally divided in two halves, it can be mounted on the cables 12 without sliding the sleeve over one of the cables as is required in the embodiment illustrated in FIGS. 1–8. As will be appreciated, in this embodiment the split tubular member 26 is not required.

While the two halves 24a and 24b of the sleeve 24 have been described as being formed by longitudinally cutting a cylindrical sleeve, it will be appreciated that the halves may be formed by a molding operation, die casting, or any other suitable method. By such methods, two halves of the sleeve 24 may be formed of complete semicylindrical shape. Hence, when the halves are mounted together, there is obtained a sleeve which is completely cylindrical without the use of spacers.

The joint of the invention is cold made, thus avoiding damage to the centering dielectric of the cables. No dimensional variation of the conductive elements of the cables and the dielectric occur in the joint. The tensile strength of the joint 10 is at least the same as that of the cables remote from the joint. This is due to the fact that no heating and annealing of the copper sheaths 16 occurs, to the inner knurling of the extensions 40 which form a tube clamp, and to the outer conicalness of tubes 30. The joint of the present invention can be readily and safely made without twisting of the conductive elements of the cables.

What is claimed is:

1. A coaxial cable joint providing continuous dimensional features and thus a constant impedance match of the conductive components and the dielectric member of the cables, each cable comprising an inner conductor and an outer metallic sheath concentric and spaced therefrom, comprising:

two metallic tubes each externally conical in shape and having an inner diameter corresponding to that of the metallic sheaths, each said tube being inserted into the ends of a corresponding one of said sheaths;

a connecting sleeve having radially flexible externally threaded extensions at the ends thereof surrounding said tubes;

a pair of nuts threadedly received on the ends of said sleeve, said nuts having tapered surfaces compressing the flexible extensions onto said tubes securing the ends of said sheaths therebetween; and means inside said sleeve extending between said tubes providing a substantially continuous metallic cylindrical inner surface having a diameter corresponding to that of said sheaths.

2. A joint as set forth in claim 1, wherein said means comprises a tubular member positioned inside said sleeve extending between said tubes.

3. A joint as set forth in claim 2 wherein said tubular member is slotted lengthwise to be tightened down to the diameter of the sheaths, and including at least one insulating disc element positioned between said member and the inner conductors of said cables to maintain said conductors coaxial within said sleeve.

4. A joint as set forth in claim 1 wherein the inner surfaces of said flexible extensions are knurled.

5. A joint as set forth in claim 1 wherein said means comprises an intermediate reduced diameter portion of said sleeve having an axial length corresponding to the distance between said tubes, the inner diameter of said intermediate portion corresponding to the inner diameter of said sheaths.

6. A joint as set forth in claim 5 wherein said sleeve comprises two halves separated along an axial diametrical plane.

7. A joint as set forth in claim 6 wherein each said sleeve half is slightly less than a semi-cylinder, and spacer means are interposed between said two halves to provide a completely cylindrical sleeve.

8. A joint as set forth in claim 7 including two semicircular strap springs with ends folded radially inwardly defining said spacer means, said springs embracing one of the halves of said sleeve.

9. A joint as set forth in claim 6 including a spring retaining clip in the shape of a flat ring received in corresponding annular grooves in the outside surface of said two halves of said sleeve axially aligning said halves.

* * * * *